US007804187B2

(12) United States Patent
Pecoul et al.

(10) Patent No.: US 7,804,187 B2
(45) Date of Patent: Sep. 28, 2010

(54) ELECTRONICALLY OPENABLE LOCK FITTING FOR A MOTOR VEHICLE

(75) Inventors: Jean-Christophe Pecoul, Créteil Cedex (FR); Tamim Belhaj, Créteil Cedex (FR)

(73) Assignee: Valeo Securite Habitacle, Creteil Cedex (FR)

(*) Notice: Subject to any disclaimer, the term of this patent is extended or adjusted under 35 U.S.C. 154(b) by 599 days.

(21) Appl. No.: 10/556,045

(22) PCT Filed: Jul. 2, 2004

(86) PCT No.: PCT/EP2004/051334

§ 371 (c)(1),
(2), (4) Date: Sep. 20, 2007

(87) PCT Pub. No.: WO2005/014960

PCT Pub. Date: Feb. 17, 2005

(65) Prior Publication Data

US 2009/0145181 A1 Jun. 11, 2009

(30) Foreign Application Priority Data

Jul. 10, 2003 (FR) .................................. 03 50314

(51) Int. Cl.
*B60L 1/00* (2006.01)

(52) U.S. Cl. ..................................................... 307/10.1

(58) Field of Classification Search ................. 307/10.1
See application file for complete search history.

(56) References Cited

U.S. PATENT DOCUMENTS

| | | | | |
|---|---|---|---|---|
| 6,056,076 | A | 5/2000 | Bartel et al. | |
| 6,648,379 | B1 | 11/2003 | Kordowski et al. | |
| 6,914,346 | B2 * | 7/2005 | Girard | 307/10.1 |
| 7,224,259 | B2 * | 5/2007 | Belmond et al. | 340/5.72 |

FOREIGN PATENT DOCUMENTS

| | | |
|---|---|---|
| EP | 0372791 | 6/1990 |
| EP | 0694664 | 1/1996 |
| EP | 1045093 | 10/2000 |

* cited by examiner

*Primary Examiner*—Michael Rutland Wallis
(74) *Attorney, Agent, or Firm*—Berenato & White, LLC

(57) ABSTRACT

The invention relates to an electrically-openable lock fitting for a motor vehicle, connected to main electric supply means (3) and to emergency electric supply means for the lock fitting in the event of a malfunction of the main electric supply means. The emergency electric supply means comprise a power reserve component (6) and electric energy reserve means (9), and an identification element (4) ensuring the identification of a user. The identification element comprises at least one signal receiver (4) communicating with an element which can deliver a signal in order to identify the user. The connection of the electric energy reserve means (9) is controlled in such a way that the electric energy reserve means (9) supply the energy reserve component (6) once identification has been made and authorized.

7 Claims, 2 Drawing Sheets

ELECTRONICALLY OPENABLE LOCK FITTING FOR A MOTOR VEHICLE

The invention relates to an electrically-openable lock fitting for a motor vehicle, connected to main electric supply means and to emergency electric supply means for the lock in the event of a malfunction of the main means, these emergency means including a power reserve component.

Patent document EP 1 130 202 proposes the use of an electronic power reserve component consisting of a supercapacitor. Such a supercapacitor constitutes a rechargeable and compact energy source. When the vehicle is in normal use, this electronic component is not required as long as the main electric supply means are operating normally. These main means then keep the supercapacitor permanently charged. When, following a failure of the main supply means, the latter are no longer able to supply the electric energy to open the lock, an electronic card automatically switches over to the supercapacitor which can operate the lock for a number of opening cycles.

Such an emergency arrangement is reliable if the lock is opened relatively soon after the failure of the main supply means, as is the case, for example, in the event of an accident.

However, if a relatively long period of time elapses between the shutdown of the main supply means by malfunction and the opening of the lock, since the supercapacitor in the passive state discharges relatively quickly, it may be that this supercapacitor is discharged and the lock then has no functional emergency means. Such is the case, for example, if the vehicle is parked or, more generally, not used for several days.

To overcome this problem, having the emergency means also include electric energy reserve means that can be connected to the power reserve component can be considered.

Such is the case with the lock disclosed in U.S. patent documents U.S. Pat. Nos. 5,497,641 and 6,056,076.

According to these documents, if the main electric supply means fail, power reserve means are switched and can be charged by electric energy reserve means coupled with the handle of the vehicle. The energy reserve means then recharge the power reserve means, which, once a sufficient charge threshold is reached, supply a signal receiver which can enable the process of identification by means of a remote control. It is via this receiver that the lock is powered.

When the action required to open the door is carried out, that is, operating of the handle, the energy reserve means are then enabled and the opening action is performed, in a single deliberate action.

However, such an emergency supply method raises the following technical problem.

When the handle is operated, in the event of failure of the main supply means, the energy reserve means are enabled, recharges the power reserve means, and it is only when the signal receiver is supplied by this power reserve that the identification can be made.

The result is that the energy reserve means could possibly be discharged by any unauthorized person operating the handle. This is particularly prejudicial to the use of relatively simple energy reserve means such as cell batteries, the life of which must be compatible with that of the vehicle, in other words approximately ten years.

To overcome this problem, the invention proposes an electrically-openable lock fitting for a motor vehicle, connected to main electric supply means and to emergency electric supply means for the lock in the event of a malfunction of the main means, these emergency means including a power reserve component and electric energy reserve means that can be connected to said power reserve component, an identification element ensuring the identification of the user, the identification element including at least one signal receiver communicating with an element which can emit a signal to identify the user, characterized in that the connection of said energy reserve means is controlled in such a way that these energy reserve means supply said power reserve component, once identification has been made and authorized.

Such an arrangement is particularly economical in terms of electric energy.

According to a preferred embodiment, said power reserve component includes at least one supercapacitor.

Preferably, said energy reserve means can be directly connected to said identification element.

In this case, preferably, said energy reserve means are enabled by an external control button disposed on the vehicle.

According to a variant, the identification element also includes a cylinder actuated by a key and said energy reserve means are enabled by actuating a contact contained in the cylinder.

Preferably, said energy reserve means are made up of at least one electric cell or an electric accumulator battery.

Advantageously, said power reserve component is directly and electrically connected to the lock.

The invention is described below in greater detail, with the help of figures representing only preferred embodiments of the invention.

Figure 1:
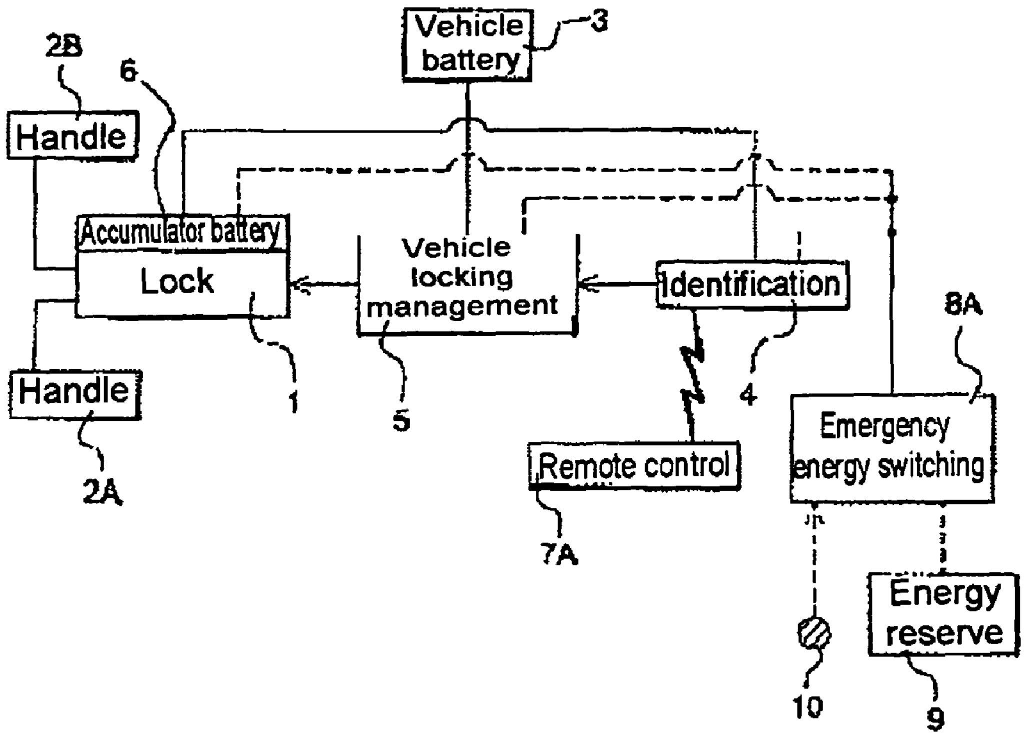
FIG. 1 is a block diagram of the operation of a lock fitting according to the invention, in which the identification is made using an RF remote control.

In the various embodiments, a lock (or lock fitting) 1 for a motor vehicle, with electrically-assisted opening, is linked to an external handle 2A and an internal handle 2B, to control its external and internal opening. It includes an electronic card forming an interface for connecting the lock to main electric supply means and to control means.

This is therefore connected to main electric supply means, normally a battery 3 installed in and supplying the motor vehicle. This battery 3 supplies a signal identification element 4, normally an RF receiver, locking management electronics 5 which actuate the locking or unlocking of the lock and a power reserve component 6, advantageously a supercapacitor.

The power reserve component 6, advantageously a supercapacitor, are electrically connected directly to the lock 1. Should the battery fail, the electronic card of the lock automatically switches over to the supercapacitor 6 which can operate the lock 1 for a number of opening cycles. This emergency operation is therefore transparent to the user. As has already been seen, this presupposes that the time period elapsing between the start of the failure of the battery 3 and this opening command is not too long, as is particularly the case in the event of an accident where the emergency services intervene very quickly. The component 6 then provides the emergency supply necessary to open the door of the vehicle, as disclosed elsewhere in patent document EP 1 130 202.

According to the first embodiment illustrated in FIG. 1, the identification is made using an RF remote control 7A.

In normal operating mode, when the battery 3 is operating normally, the user operates this remote control 7A which communicates with the RF receiver 4, disposed inside the vehicle. Once the identifier has been recognized, this receiver 4 switches the management electronics 5 causing the lock 1 to be unlocked. When the handle 2A is operated, the battery supplies the lock 1 which can be opened.

Should the battery fail, the electronic card of the lock switches over automatically to the supercapacitor 6 which enables the lock 1 to be opened, in the event of an accident for example.

If this supercapacitor 6 is discharged, for example after the vehicle has been parked for a long time, attempts to operate the remote control 7A by the user give no result.

By a deliberate action, preferably by operating a button 10 on the outside of the vehicle, the user enables the energy reserve means 9 which, via a switching stage 8A, first supplies the receiver 4.

The identification can then be made by RF link between the remote control 7A and the receiver 4. Only when the user has been recognized will the switch be made for the energy reserve means to supply the management electronics 5 and the supercapacitor 6 which is recharged rapidly in a few seconds.

Just after this first deliberate action on the button 10, the user is therefore identified by conventional action on the remote control, then the unlocking of the lock 1 is allowed. The lock 1 can then be opened by means of the recharged supercapacitor 6, by operating the handle 2A.

Figure 2:
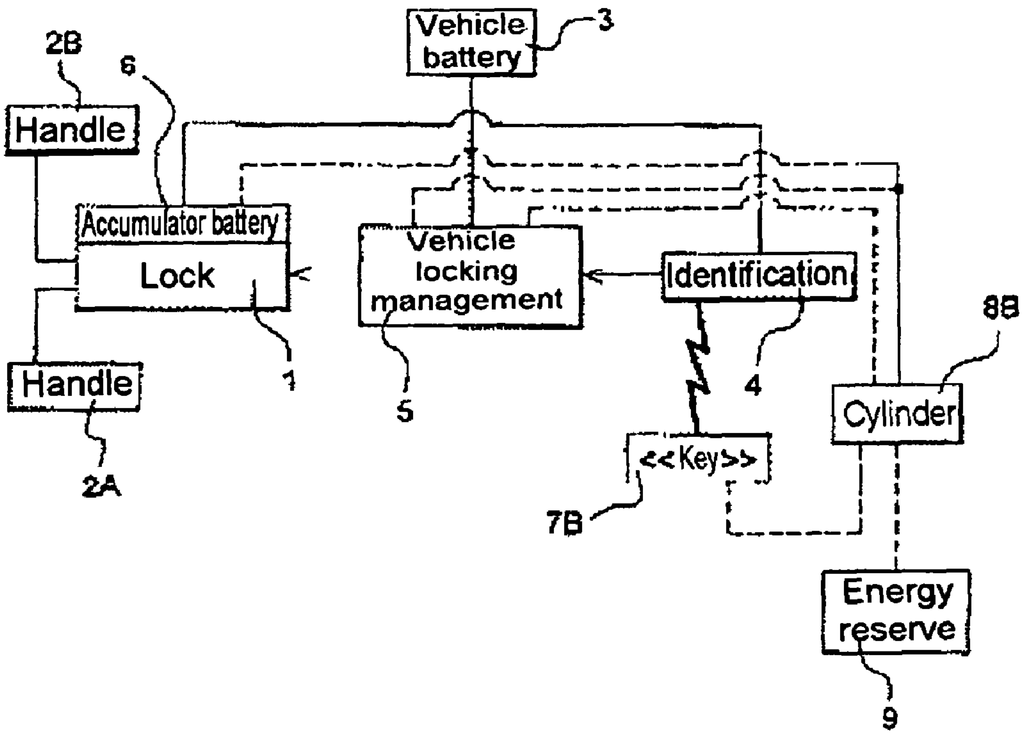
FIG. 2 is a block diagram of the operation of a lock fitting according to the invention, in which the identification is made using an RF remote control or badge provided with an emergency mechanical key.

According to the second embodiment illustrated in FIG. 2, the identification is made using an RF badge provided with an emergency mechanical key 7B.

In normal operating mode, when the battery 3 is operating normally, the user approaches to a threshold distance from the vehicle and his RF badge communicates with the RF receiver 4, disposed inside the vehicle. Once the identifier has been recognized, this receiver 4 switches the management electronics 5 causing the lock 1 to be unlocked. When the handle 2A is operated, the battery supplies the lock 1 which can be opened.

Should the battery fail, the electronic card switches over automatically to the supercapacitor 6 to enable the lock 1 to be opened, for example in the event of an accident.

If this supercapacitor 6 is discharged, for example after the vehicle has been parked for a long time, the presence of the badge 7B worn by the user gives no result.

The user then uses the mechanical key carried by his badge 7B, or else separate from the latter, and inserts it in a cylinder in the door. This cylinder 8B includes a contact performing the switchover enabling the energy reserve means 9 which successively or simultaneously supply the receiver 4, the management electronics 5 and the supercapacitor 6 which is recharged rapidly.

Just after this deliberate action consisting in operating the mechanical key in its cylinder, the user is identified by RF link between his badge and the receiver 4 and the unlocking of the lock 1 is enabled. The lock 1 can then be opened by means of the recharged supercapacitor 6, by operating the handle 2A.

Figure 3:
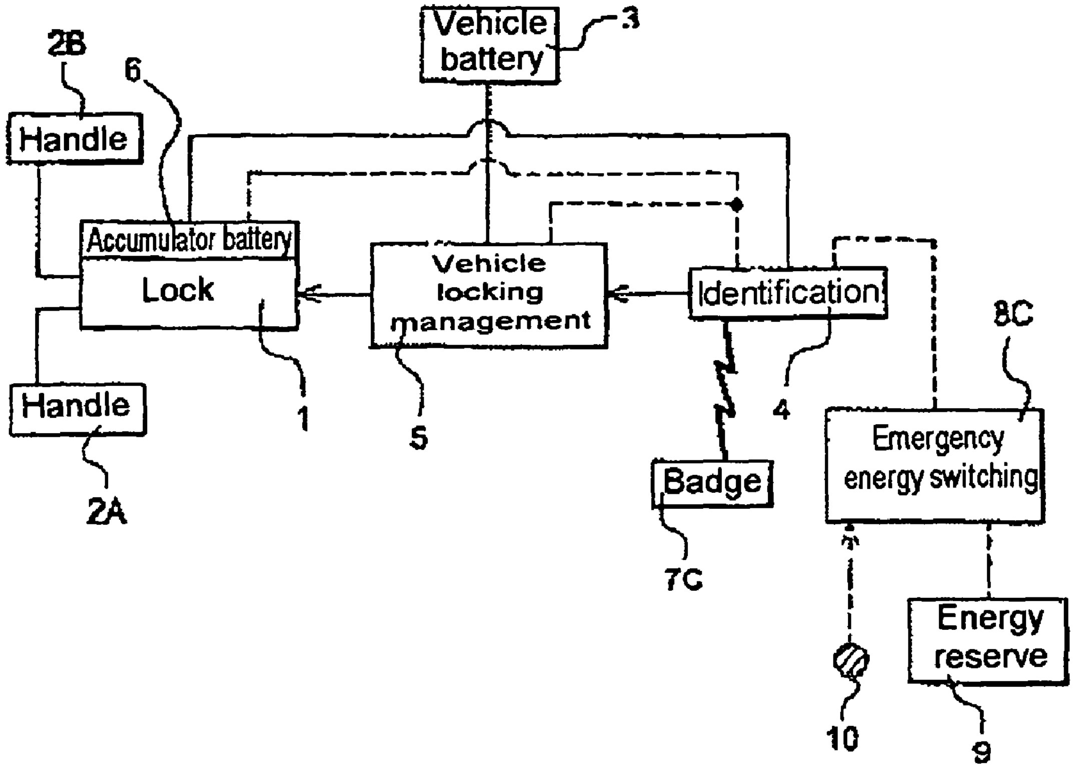
FIG. 3 is a block diagram of the operation of a lock fitting according to the invention, in which the identification is made using a so-called "hands-free" RF badge.

According to the third embodiment illustrated in FIG. 3, the identification is made using an RF badge 7C, which may or may not be provided with an emergency mechanical key.

In normal operating mode, when the battery 3 is operating normally, the user approaches to a threshold distance from the vehicle and his RF badge communicates with the RF receiver 4, disposed inside the vehicle. Once the identifier has been recognized, this receiver 4 switches the management electronics 5 causing the lock 1 to be unlocked. When the handle 2A is operated, the battery supplies the lock 1 which can be opened.

Should the battery fail, the electronic card of the lock switches over automatically to the supercapacitor 6 which can allow the lock 1 to be opened, for example in the event of an accident.

If this supercapacitor 6 is discharged, for example after the vehicle has been parked for a long time, the presence of the badge 7B worn by the user gives no result.

By a deliberate action, preferably by operating a button 10 on the outside of the vehicle, the user enables the energy reserve means 9 which, by means of a switching stage 8C, first supplies the receiver 4.

The identification can then be made by RF link between the badge 7C and the receiver 4. Only when the user has been recognized will the switchover be made for the energy reserve means to supply the management electronics 5 and the supercapacitor 6 which is recharged rapidly.

Just after this deliberate action consisting in operating the button 10 outside the vehicle, the user is therefore identified and then the unlocking of the lock 1 is enabled. The lock 1 can then be opened by means of the recharged supercapacitor 6, by operating the handle 2A.

According to the invention, the electric energy reserve means 9 can be a set of cells or accumulator batteries or one cell or one accumulator battery coupled with a voltage step-up converter. These electric energy reserve means can be inside the vehicle or be portable and connectable to the outside of the vehicle.

As has been seen, the invention applies to a lock associated with an identification by RF remote control or RF badge, possibly with an emergency mechanical key or associated with a mechanical identification by key and cylinder. It applies also to a lock inserted in a door module, in which lock, identification element and locking management electronics are integrated in a motor vehicle door.

The invention also applies to any badge or remote control type identifier. For example, instead of a receiver and an RF badge, a system with transponder activated by an identifier triggering a Hall-effect sensor type contactless proximity detector.

The invention claimed is:

1. An electrically-openable lock fitting for a motor vehicle, connected to main electric supply means (3) and to emergency electric supply means for supplying electric power to the lock fitting in the event of a malfunction of the main electric supply means, the emergency electric supply means including:

- a power reserve component (6) and electric energy reserve means (9) selectively connectable to and disconnectable from the power reserve component (6), and
- an identification element (4) ensuring the identification of a user,
- the identification element including at least one signal receiver (4) communicating with an element emitting a signal to identify the user,
- the connection of the electric energy reserve means (9) being controlled in such a way that the electric energy reserve means (9) supply the power reserve component (6) once identification has been made and authorized.

2. The fitting as claimed in claim 1, wherein the power reserve component (6) includes at least one supercapacitor.

3. The fitting as claimed in claim 1, wherein the energy reserve means (9) can be directly connected to the identification element (4).

4. The fitting as claimed in claim 3, wherein the energy reserve means (9) are enabled by an external control button (10) disposed on the vehicle.

5. The fitting as claimed in claim 1, wherein the identification element also includes a cylinder (8B) actuated by a key and in that the energy reserve means (9) are enabled by actuating a contact contained in the cylinder (8B).

6. The fitting as claimed in claim 1, wherein the energy reserve means (9) are made up of at least one electric cell or an electric accumulator battery.

7. The fitting as claimed in claim 1, wherein the power reserve component (6) is directly and electrically connected to the lock (1).

* * * * *